No. 771,039. Patented September 27, 1904.

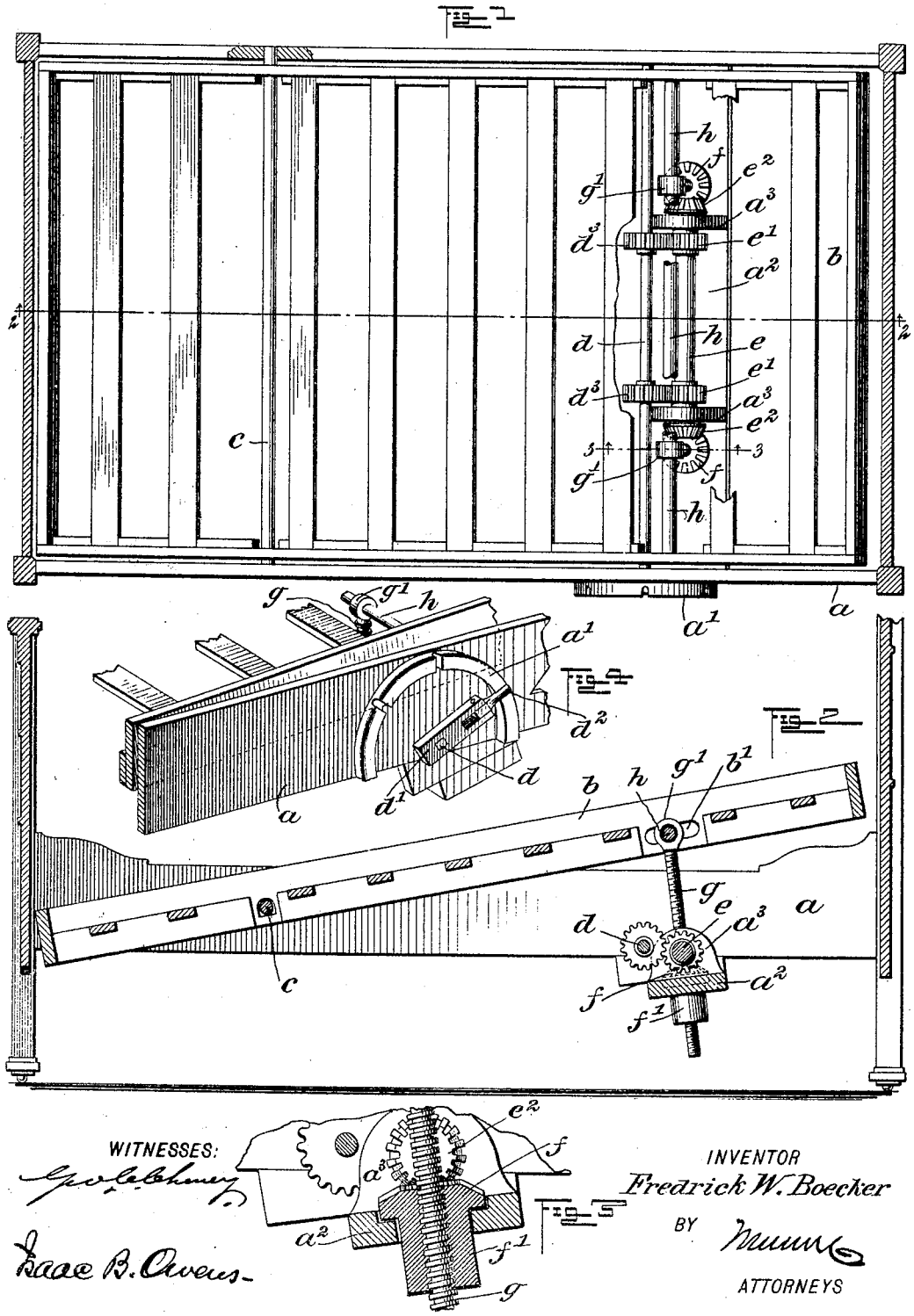

UNITED STATES PATENT OFFICE.

FREDRICK WILLIAM BOECKER, OF OAKLAND, CALIFORNIA.

BED OR COUCH.

SPECIFICATION forming part of Letters Patent No. 771,039, dated September 27, 1904.

Application filed September 16, 1903. Serial No. 173,402. (No model.)

*To all whom it may concern:*

Be it known that I, FREDRICK WILLIAM BOECKER, a citizen of the United States, and a resident of Oakland, in the county of Alameda and State of California, have invented a new and Improved Bed or Couch, of which the following is a full, clear, and exact description.

The object of this invention is to provide a bed, couch, sofa, or the like which may be readily adjusted from the horizontal to any desired inclination. This end I attain by certain novel devices mounted on the bed-frame and having connection with a supplemental or slat frame, which is pivoted on the main frame and which carries the mattress and bedclothes.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention with parts broken away. Fig. 2 is a longitudinal section on the line 2 2 of Fig. 1. Fig. 3 is a detail section on the line 3 3 of Fig. 1; and Fig. 4 is a fragmentary perspective illustrating particularly the crank-arm for operating the adjusting device and the locking means for said crank-arm.

$a$ indicates the frame of the bed, which may be of any form desired.

$b$ indicates the supplemental or slat frame, which is pivoted to swing on the main frame $a$ around an axle or shaft $c$. Mounted in the main frame $a$ is a revoluble shaft $d$, which, as best shown in Fig. 4, carries a crank-arm $d'$. This crank-arm carries at its free end a pivoted dog $d^2$, and said dog coacts with a notched quadrant-bar $a'$, fastened to the main frame $a$ on the outside thereof. By means of the crank $d'$ the shaft $d$ may be turned in either direction, and by throwing the dog $d^2$ into the position shown in Fig. 4 said dog will lock the crank and shaft against further movement. The dog $d^2$ should be friction-tight on the crank $d'$, so that it will stay in the position in which it is put, and when said dog is moved to its outer position it will serve as a wrist-pin or handle for the crank.

Extending transversely across the under side of the main frame $a$ is a bridge $a^2$, on which are bearings $a^3$. Said bearings carry a revoluble shaft $e$, having gears $e'$ fastened thereto, and the gears $e'$ are in mesh with gears $d^3$, fastened on the shaft $d$, by which arrangement the shaft $e$ is driven upon the revolution of the shaft $d$. Said shaft $e$ carries at each end thereof a bevel-gear $e^2$, and these gears are in mesh with corresponding gears $f$, the elongated hubs $f'$ of which are interiorly threaded and mounted to turn freely in the bridge $a^2$. Working in the interiorly-threaded hubs $f'$ are screws $g$, and said screws have eyes $g'$ at their upper ends which receive a cross-bar $h$. The cross-bar $h$ extends transversely from one side of the bed to the other and has its end portions fitted loosely in longitudinally-extending slots $b'$, formed in the slat-frame $b$. (See Fig. 2.) Now it is clear that by operating the shaft $d$ movement will be imparted to the gears $f$ through the medium of the elements $d^3$, $d'$, $e$, and $e^2$. According to the direction which this movement takes, the screws $g$ will be either raised or lowered, and through the medium of the rod $h$ the head portion of the slat-frame $b$ will be raised or lowered to place the slat-frame at any desired inclination.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a bed, the combination with the main frame, of a slat-frame mounted movably thereon, a shaft revolubly mounted on the main frame, two interiorly-threaded members forming nuts also revolubly mounted in the main frame, gearing connecting said nuts with said shaft, screws working in the nuts, a transverse rod connecting the screws with the slat-frame, a second shaft, gearing connecting the second shaft with the first shaft, and means for operating the second shaft.

2. The combination of a main bed-frame, a slat-frame movable thereon, a vertically-extending member, means connected with said member and mounted on the main frame for raising and lowering the member, and a transverse rod engaged with said vertically-extending member and with the bed-frame and being capable of lateral movement on the bed-frame, for the purpose specified.

3. The combination of a main or bed frame, a slat-frame movably mounted thereon, means for moving the slat-frame, said means including a turning shaft, an arm attached to said shaft, a dog mounted on the arm, and a quadrant with which the dog coacts, the said dog being pivotally carried on the arm and being capable of movement into alinement therewith into engagement with the quadrant or of swinging outward at an angle to the arm to form a wrist-pin, whereby to facilitate the operation of the shaft.

4. The combination of a main or bed frame, a slat-frame movably mounted thereon, two screws in connection with the slat-frame, two nuts revolubly mounted on the bed-frame and coacting respectively with the screws, a shaft revolubly mounted in the bed-frame, gearing connecting the ends of the shaft respectively with the nuts, a second shaft revolubly mounted in the bed-frame, gearing connecting the second shaft with the first shaft, and means for operating the second shaft.

5. The combination of a main or bed frame, a slat-frame movably mounted thereon, two screws in connection with the slat-frame, two nuts revolubly mounted on the bed-frame and coacting respectively with the screws, a shaft revolubly mounted in the bed-frame, gearing connecting the ends of the shaft respectively with the nuts, a second shaft revolubly mounted in the bed-frame, gearing connecting the second shaft with the first shaft, and means for operating the second shaft, said means for operating the second shaft comprising an arm attached thereto, a dog pivotally mounted on the arm and capable of swinging outward into alinement therewith and a quadrant engaged by the dog when in its outer position, the dog serving when moved inward as a wrist-pin to facilitate the swinging of the arm.

In testimony whereof I have signed my name to this specification in the presence of two subscribing witnesses.

FREDRICK WILLIAM BOECKER.

Witnesses:
BURTON JAMES WHITE,
J. B. HOPKINS.